G. W. MATZ.
TIRE HOLDER FOR AUTOMOBILES AND SIMILAR VEHICLES.
APPLICATION FILED SEPT. 19, 1914.
1,171,968.
Patented Feb. 15, 1916.
FIG. I.
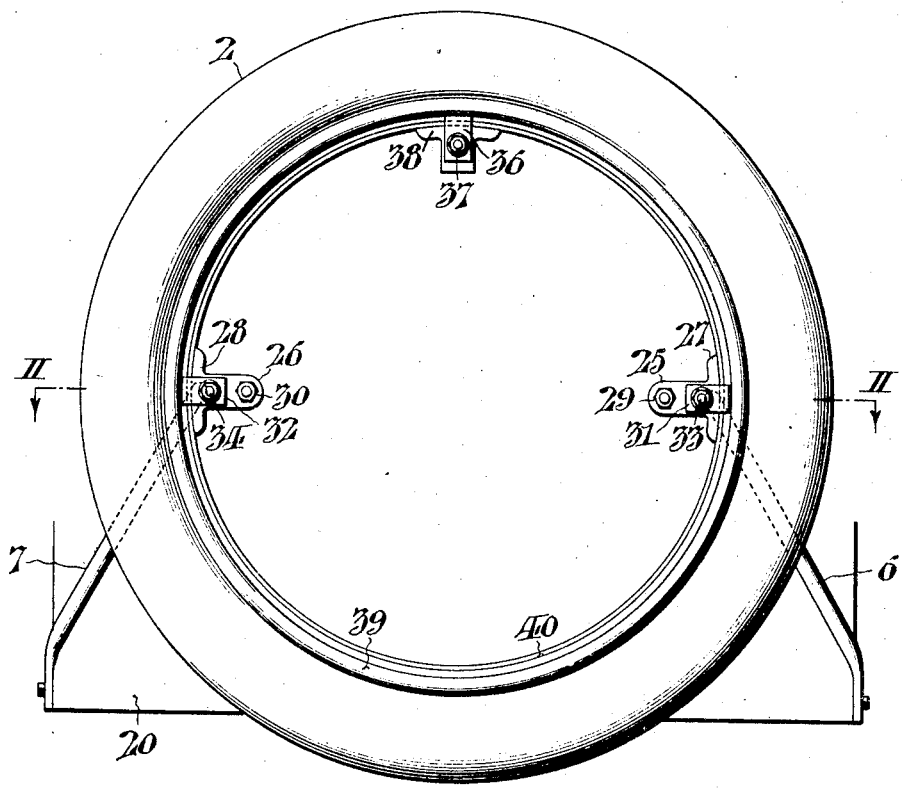
FIG. II.
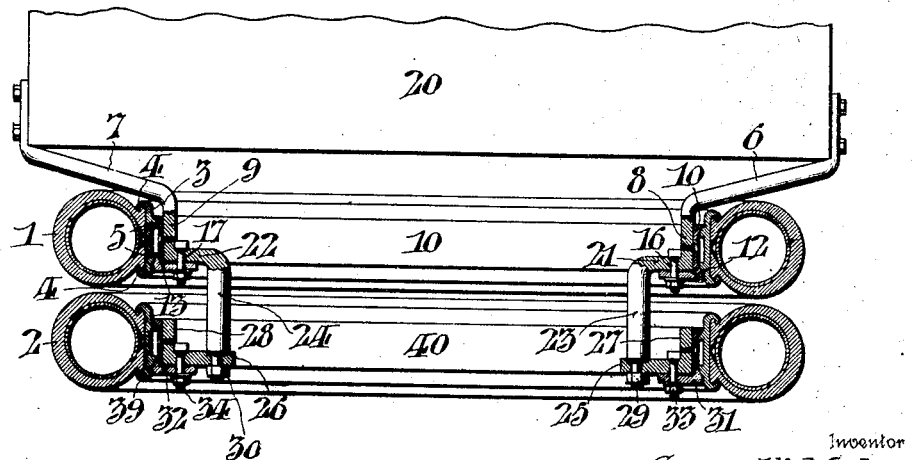
Witnesses
John C. Bergner
James H. Bell
Inventor
George W. Matz
By Foley & Paul
Attorneys

UNITED STATES PATENT OFFICE.

GEORGE W. MATZ, OF CONSHOHOCKEN, PENNSYLVANIA.

TIRE-HOLDER FOR AUTOMOBILES AND SIMILAR VEHICLES.

1,171,968.

Specification of Letters Patent.

Patented Feb. 15, 1916.

Application filed September 19, 1914. Serial No. 862,450.

*To all whom it may concern:*

Be it known that I, GEORGE W. MATZ, of Conshohocken, in the county of Montgomery and State of Pennsylvania, have invented certain new and useful Improvements in Tire-Holders for Automobiles and Similar Vehicles, whereof the following is a specification, reference being had to the accompanying drawings.

The object of my invention is to provide means for carrying one or more spare tires, at a convenient place upon the vehicle, and to so construct the tire holder as to not only efficiently secure the spare tire, or tires, in place, while carried, but to avoid any irregular or uneven wear thereof, such as is occasioned by purely local supports of the kind now generally in use, which make contact with the tire at only very limited regions, and subject it to irregular wear. It has been found that tires are sometimes seriously impaired by rubbing or pressing upon such supporting devices.

In the accompanying drawings, I have shown the invention as embodied in a device which is capable of carrying two spare tires, and in said drawings, Figure I, is a view in end elevation of the device, showing only the tire nearest the observer. Fig. II, is a horizontal section on the line II, II, of Fig. I.

The device is conveniently attached to the rear portion of the chassis of an automobile and it is thus illustrated, a portion of said body being conventionally shown at 20.

The tires carried are indicated respectively at 1, and 2, and for purposes of convenience, it is preferable to commence the description by referring to those parts which engage and support the innermost tire 1, of the pair thus carried. Said tire is represented as having the usual cross section and is directly mounted upon the clencher rim 3, having the cross-section shown, whose overhanging flanges 4, 4, engage the beads at the respective sides of the tire, and whose inner surface is provided with the oppositely inclined ribs 5, 5. Upon the chassis 20, of the vehicle and preferably at the rear side thereof, I provide two supporting elements 6, and 7, respectively, which preferably converge somewhat as they rise from their points of attachment and which are bent so as to extend rearwardly in substantial parallelism to one another, as indicated at the regions marked 8, and 9. Said portions 8, and 9, are flattened and slightly rounded on the surfaces remote from one another, so as to firmly support the annular band 10, whose cross section is such as to provide upon its outer surface an elongated wedge adapted to engage directly with one of the inclines 5, upon the clencher rim 3. The elongated wedge just referred to is, of course, that portion of the band which is uppermost in the cross sectional view of Fig. II. In the instance shown, the band 10, is a complete annulus and, therefore, engages with the clencher rim throughout the entire periphery of the latter. The band 10, is preferably of wedge shape cross section at its other edge as indicated at the lower side in the sectional view in Fig. II. This band 10, is secured to the flattened portions 8, and 9, of the supports 6 and 7 by means of screws as shown.

The supports 6, and 7, at the extremity of the flattened regions 8, and 9, turn inward at a right angle, as indicated at 21, and 22, and are flattened to afford seats for the clamping wedge pieces 12, and 13, respectively, whose cross section and dimensions are such as to operatively engage the second incline 5, characteristic of a clencher rim, such as 3, and also, in this instance, to engage the inclined surface at that edge of the band 10, which is lowest in Fig. II. Screw bolts 16, and 17, are provided, whereby these clamping wedges 12, and 13, may be forced into engagement with the respective inclines upon the rim 3, and the band 10, so as to firmly hold the rim 3, and with it the tire 1, in position.

If the device is only intended to carry one tire, the supports 6, and 7, may terminate just beyond the seats 21, and 22, but if it is desired (as in the instance shown), to carry a pair of tires, the supports 6, and 7, are provided with stepped extensions, which project at right angles from the extremities of the seat regions 21, and 22, to form rearward parallel projections 23, and 24, which carry by means of screw bolts 29, and 30, the removable supporting blocks 25, and 26. Said blocks have the right angled cross section shown, the parts 27, and 28, being extended and slightly rounded on their outer faces to snugly seat the band 40, which is similar in construction to the band 10, previously described.

The tire 2, is carried upon a clencher rim 39, similar to the rim 3, and the elements are forced into engagement and held by means of the clamping wedges 31, and 32, actuated by the screw bolts 33, and 34, respectively. To insure a maximum degree of security, I also provide at the top portion of the band 40, an auxiliary clamping wedge 36, applied by means of a screw bolt 37, carried by and abutting against the downwardly depending lug 38, which is mounted upon the band 40. A similar device is applied to the band 10.

It will be noted that in the instance shown, the two points of direct support are diametrically opposite to one another, and that the third or auxiliary support is arranged in quadrant relation thereto at the upper side of the circumference. I do not however desire to restrict myself to this exact disposition of the points of support, it being only necessary that they should be at a substantial angular distance from one another, so as to afford a properly extended support for the devices which they respectively carry. I have also indicated both the inner bands 10, and 40, as being completely annular, since I consider this to be the most desirable form thereof. They may however, be made of less circumferential extent, since they do not come in contact with the tire. I therefore do not limit myself to the exact form shown, provided the holding element is of such character as to engage directly with the incline of the clencher rim throughout such an extended portion of its periphery as to make properly available the continuous support which said rim thus affords, and provided said element is capable of the ready attachment and detachment characteristic of the organization shown and described.

Having thus described my invention, I claim:

1. The combination of a plurality of supports adapted to be secured to a vehicle body, said supports comprising portions which extend substantially parallel to one another, and which have bearing surfaces upon their remote faces and seat portions extending at right angles to said bearing surfaces; a band extending through a circular arc which comprehends all of said supports, said band having a cross section which provides an extended wedge on its outer face adapted to engage directly with one incline upon a clencher rim; a plurality of clamping wedges adapted to engage directly the other and oppositely faced incline upon a clencher rim, said wedges having extended portions adapted to rest upon said seats; and securing means adapted to operatively engage said clamping wedges, substantially as set forth.

2. The combination of a plurality of supports adapted to be secured to a vehicle body, said supports comprising portions which extend substantially parallel to one another and which have bearing surfaces upon their remote faces and seat portions extending at right angles to said bearing surfaces, and being also provided with inwardly stepped extensions comprising seat portions arranged substantially at right angles to said bearing surfaces and prolongations arranged in substantial parallelism and at right angles to said seat portions; a plurality of bands extending through circular arcs comprehending said points of support, and each having a cross section which presents an extended wedge surface adapted to engage an oppositely faced incline upon a clencher rim, one of said bands being directly secured to said first mentioned bearing surfaces; supporting blocks removably mounted upon the prolonged extremities of the supports, the other of said bands being secured to said supporting blocks; groups of clamping wedges respectively adapted to engage each of said bands and to engage an oppositely faced incline upon a clencher rim; and securing means adapted to operatively engage said clamping wedges, substantially as set forth.

In testimony whereof, I have hereunto signed my name at Philadelphia, Pennsylvania, this seventeenth day of September, 1914.

GEORGE W. MATZ.

Witnesses:
JAMES H. BELL,
E. L. FULLERTON.